United States Patent [19]
Davis

[11] 4,071,267
[45] Jan. 31, 1978

[54] SHROUDED PIPE WALL CASTING FOR USE WITH SPLIT-CLAMP COUPLINGS

[76] Inventor: Samuel H. Davis, 111 Forest Drive, Jericho, N.Y. 11753

[21] Appl. No.: 680,740

[22] Filed: Apr. 27, 1976

[51] Int. Cl.² .............................................. F16L 3/00
[52] U.S. Cl. ...................................... 285/64; 52/220; 285/158; 285/331; 285/410; 285/417
[58] Field of Search .................. 285/64, 61, 158, 367, 285/373, 419, 410, 175, DIG. 7, 45, 189, 331, 417; 248/13, 14, 49, 65; 138/105, 106, 109, 177; 403/191, 189; 52/220, 221

[56] References Cited

U.S. PATENT DOCUMENTS

| | | | |
|---|---|---|---|
| 1,141,269 | 6/1915 | Rice | 285/158 |
| 1,928,122 | 9/1933 | Bennett | 285/DIG. 7 |
| 3,078,477 | 2/1963 | Schmid et al. | 285/61 X |
| 3,645,564 | 2/1972 | Corriston | 285/61 X |

FOREIGN PATENT DOCUMENTS

| | | | |
|---|---|---|---|
| 579,721 | 7/1959 | Canada | 285/158 |
| 1,180,652 | 1/1959 | France | 285/61 |
| 831,568 | 3/1960 | United Kingdom | 285/61 |

*Primary Examiner*—Dave W. Arola
*Attorney, Agent, or Firm*—Kenyon & Kenyon, Reilly, Carr & Chapin

[57] ABSTRACT

A pipe wall casting for installation in a poured concrete tank wall. The length of the wall casting is equal to the wall thickness, and the ends of the wall casting are grooved or shouldered for use with standard split-clamp couplings. A radially spaced annular shroud surrounds each end of the connector to provide an access well having clearance for installing or removing a split-clamp coupling. An integral water-stop flange around the outside of the shroud has outwardly extending tabs provided with rigging holes for mounting the wall casting on a free-standing support structure independently of the formwork for the concrete wall.

8 Claims, 4 Drawing Figures

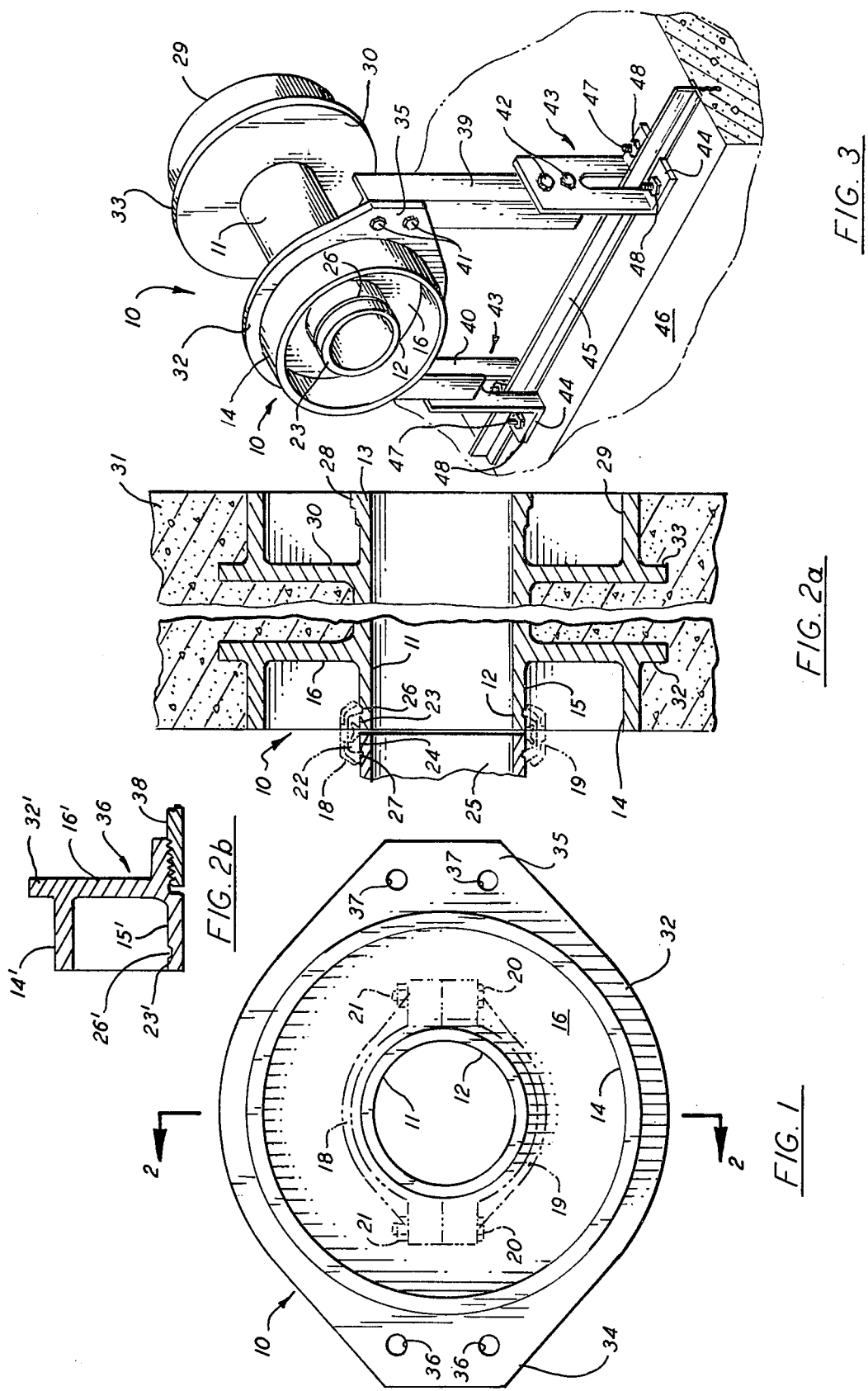

SHROUDED PIPE WALL CASTING FOR USE WITH SPLIT-CLAMP COUPLINGS

BACKGROUND OF THE INVENTION

1. Field of the Invention

The present invention relates to pipe fittings employing split-clamp type couplings and particularly to piping wall castings for use with such couplings.

2. Description of the Prior Art

The type of piping connectors known in the trade as wall castings are fittings intended to be preplaced in poured concrete walls where pipe penetrations are required. After the concrete has set and the forms have been stripped, continuing piping is then coupled to the wall casting on one or both sides of the wall. Such wall castings are used extensively in water filtration and sewage treatment plants, in sizes ranging from 4 to 48 inches.

In order to connect the continuing piping, wall castings are typically supplied either with plain bolting flanges or with bell ends. The plain flanges are usually drilled and tapped for studs to allow a similarly flanged continutation pipe to be bolted on. Although a flanged connection is inexpensive and easy to assemble and disassemble, it requires precise alignment of the continuation piping with the wall casting, or the joint will leak.

On the other hand, a bell end coupling, which is technically termed a mechanical-joint connection, will accomodate approximately 2° to 5° of angular misalignment at the joint. A mechanical-joint coupling is assembled by inserting a plain end of one pipe section into a bell end of another pipe section or fitting, after first slipping a flanged gland and a rubber gasket over the plain end. The gasket fits inside the bell and is maintained in compression by bolting the flange of the gland to a mating flange on the bell end. A drawback to the mechanical-joint type of connection, however, is that the joint is held together only by the friction between the rubber gasket and the inner pipe that results from the pressure exerted on the gasket by the gland.

A third type of commonly used coupling is a split-clamp type known as a Victaulic coupling, after the manufacturer. This coupling combines the advantage of a mechanically secure joint, as provided by flanged couplings, with the ability to tolerate several degrees of angular misalignment, as provided by mechanical-joint couplings. It comprises a resilient gasket, which bridges two butted pipe ends, and a split clamp in the form of two semicircular shells which, when bolted together, sealingly compress the gasket against the circumference of each pipe end.

To accept this coupling, each pipe is formed with a circumferential groove spaced a short distance from the end or, in the larger sizes, with a circumferential shoulder located at the end. The split-clamp shells each have a U-shaped cross section. The sides of the U face inward, enclosing and compressing the gasket against the pipe and also engaging the groove or the shoulder to lock the butted pipe ends together. Thus, the split-clamp type of coupling is simple and easy to assemble.

Because the gasket and clamp fit around the outside of the pipe ends, however, this coupling can be used only where there is sufficient clearance around the joint for installation and removal. Consequently, there has been little application of split-clamp type couplings to wall castings, in spite of their many advantages. It has always been considered necessary for the pipe ends to extend beyond the sides of the finished wall so that they would be accessible for mounting the gasket and clamp. This means cutting holes in the forms, which then must be repaired before they can be used again at a different location. If repair proves too expensive, the forms must be discarded.

In addition, it is often required that the pipe line continuing from the wall casting be installed close to the wall to simplify pipe hanger requirements and also to take up less space. If the wall casting joint is displaced several inches out from the wall, this requirement cannot be met, at least not without additional pipe fittings,.

SUMMARY OF THE INVENTION

It is an object of the present invention to provide a piping wall casting for use with split clamp couplings that will fit between formwork for a concrete wall without cutting the forms.

It is a further object of the invention to provide a wall casting having at least one end adapted for a split clamp coupling, in which the end does not extend beyond the face of the wall and is surrounded by a shroud to permit access for mounting the coupling.

Another object of the invention is to provide a wall casting with a shrouded end, and the shroud having an integral water stop flange.

Still another object of the invention is to provide a wall casting with a shrouded end and integral mounting means on the shroud for attachment to support structure that is independent of the wall formwork.

It is another object of the invention to provide a structure and method for supporting a wall casting independently of the wall formwork.

These and other objects are achieved by a pipe fitting adapted for use as a wall casting in a poured concrete wall, the fitting comprising a cylindrical pipe barrel having a first end and a second end. At least the first end is adapted to be connected to another pipe end by a split-clamp coupling. An annular shroud surrounds the first end in radially spaced relation to the outer surface of the pipe barrel, the shroud being attached to the pipe barrel at a location spaced from the first end to form an open well for access to mount a split-clamp coupling on the first end.

The second end of the pipe barrel may be adapted also for use with a split-clamp coupling and have a similar shroud surrounding it; or the second end may be left plain or have a standard flange or mechanical joint bell end, depending on the intended application.

The shrouds on the one or both ends of the fitting may be cast integrally with the pipe barrel. Alternatively, the shrouds and pipe barrel ends may be cast as separate units adapted to be threaded onto sections of plain pipe; so that a wall casting assembly of any desired length can be made up by using a single mold pattern for each pipe size.

The fitting of the present invention also incorporates additional features, including a circumferential blank flange extending radially from the periphery of the shroud at a location spaced axially inward from the corresponding end to serve as a waterstop when the fitting is installed in a concrete wall.

Another feature includes mounting means attached to the fitting intermediate the first and second ends, the mounting means being adapted to be attached to a supporting structure for the fitting. Preferably the mounting means are formed as integral lugs extending outwardly from the periphery of the water stop flange, the lugs having mounting holes for attachment to the upper ends of columnar members serving as part of a free-standing support structure, not requiring any attachment to adjacent wall formwork.

A preferred support structure according to the invention includes an angle column, having one end fastened to one of the mounting lugs, and a pedestal bracket, having a leg portion fastened to the other end of the angle column and a foot portion extending substantially normal to the leg portion, the foot portion being adapted to be bolted to a wall foundation. Desirably, the foot portion and the lower part of the leg portion are split or bifurcated to permit the bracket to straddle a water stop barrier strip of the type that is customarily inset into the top of a concrete tank foundation before pouring the tank wall.

These and other features of the present invention will be shown and described in more detail in the following description of the preferred embodiments in conjunction with the attached drawings.

BRIEF DESCRIPTION OF THE DRAWINGS

FIG. 1 is an end view of a pipe wall casting having an annular shroud spaced around an end, which is adapted for use with a split-clamp coupling, and a blank water stop flange with integral outwardly extending mounting lugs.

FIG. 2a is a side view in section, taken along line 2—2 of FIG. 1, showing integrally cast shrouds surrounding both ends of the wall casting.

FIG. 2b is a partial side view of an alternate embodiment of a shrouded wall casting in which the shrouded end is made as a separate threaded fitting.

FIG. 3 is a perspective view of a free-standing shrouded wall casting and support structure assembly.

DESCRIPTION OF THE PREFERRED EMBODIMENTS

Referring to FIGS. 1 and 2a, a pipe wall casting 10 is formed with a cylindrical pipe barrel 11 having a first end 12 and a second end 13. An annular shroud 14 surrounds the first end in radially spaced relation to the outer surface 15. The shroud is attached to the pipe barrel by an integral circumferential wall 16 that lies in a plane spaced from the first end to form an open well. The clearance between the shroud and the pipe barrel and the spacing of the circumferential wall from the first end are sufficient for the well to provide full access to mount a conventional split-clamp coupling (shown in dashed lines) on the first end.

A split-clamp coupling consists of two semicircular shells 18 and 19 fastened together by bolts 20 and nuts 21. Each semicircular shell has a generally U-shaped cross section, as shown in FIG. 2a, with the sides of the U facing inward. A resilient gasket 22, also U-shaped in cross section, fits inside the shells of the split-clamp coupling with the sides of the U bridging a circumferential land 23 on the first end of the wall casting and a circumferential land 24 on the adjacent end of a pipe section 25 butted against the first end 12.

The resilient gasket is sealingly clamped against the circumferential lands on the butted ends of the two pipes by the shells of the split-clamp coupling to form a liquid-tight seal, and the inner edges of the shells fit within the circumferential grooves 26 and 27 to mechanically lock the two pipes together. At the same time, there is sufficient clearance of the clamp in the grooves to accomodate some misalignment between the pipes, both angular and axial, without adversely affecting the joint seal.

Although the use of a circumferential groove near the end of each pipe is satisfactory for making a mechanically secured joint with split-clamp couplings in the smaller pipe sizes (up to about 18 inches in diameter), such a groove will create unacceptable weakening of the relatively thinner wall of large diameter pipe. For the larger sizes, therefore, the end is formed with a raised circumferential land 28, as shown in FIG. 2a on the second end of wall casting 10. The second end of wall casting 10 is also surrounded by an annular shroud 29, which is attached to the pipe barrel by a circumferential wall 30 to form an open well identical to the open well on the first end of the wall casting.

It will be appreciated, of course, that for a given size wall casting, both ends normally will be finished in the same way (i.e., both grooved or both with raised lands) if both ends are to be used with split-clamp couplings. On the other hand, the second end of the wall casting can be left plain, or threaded for a flange, or formed with a bell end for a mechanical-joint coupling, depending on the intended use of the wall casting.

As illustrated by FIG. 2a, the shrouded wall casting of the present invention is intended for use as a piping penetration through a poured concrete wall 31 of a building or a tank, such as a sewage treatment tank. The shrouded design permits the first and second ends of the wall casting to be flush with the respective sides of the concrete wall while still providing full access to the ends of the pipe barrel for installation or removal of a standard split-clamp coupling.

It is customary when making up wall castings to provide an intermediate blank flange, usually at the middle of the pipe barrel, to act as a water stop barrier. This is necessary because of the difficulty in obtaining a good seal between the outside surface of the wall casting and the surrounding concrete. The central flange provides a barrier to liquid seeping from one side of the wall through voids in the concrete adjacent to the exterior surface of the wall casting.

The shrouded wall casting 10 includes two water stop flanges 32 and 33 on the shrouds 14 and 29, respectively. Each water stop flange is formed as an integral outward extension of the respective shroud attachment walls 16 and 30, and water stop 32 in addition incorporates outwardly extending mounting lugs 34 and 35 having mounting holes 36 and 37, respectively.

The wall casting of FIG. 2a is a monolithic unit in which the pipe barrel, shrouds, water stop flanges and mounting lugs are cast integrally at one time. This is a preferred method of fabrication when a large number of identical fittings is required, because of the structural strength and integrity of the finished unit and because only one casting operation is required.

In many applications the number of wall castings of a given pipe diameter and length is not sufficient to justify the cost of a special pattern. Also, it is desirable to have wall castings in stock to fill rush orders, but the number of lengths in each size needed for various concrete wall thicknesses would demand an excessive inventory.

Referring to FIG. 2b, an alternate embodiment of the present invention comprises a separate shrouded pipe end 36 having an internally threaded hub 37 that is adapted to be screwed onto an externally threaded end of a plain pipe section 38 of any desired length. All other elements of shrouded end 36 are identical to elements of the embodiment of FIG. 2a and are identified by the same reference numerals plus a prime.

These separate shrouded ends can be made from standard patterns for each pipe size and maintained in stock.

When a wall casting of a specified length is required, it can be quickly and easily assembled merely by cutting to length and threading a piece of standard pipe and screwing the shrouded end onto the pipe. Another shrouded end, or a threaded flange or threaded bell end can be screwed onto the other end of the pipe section, as desired. Consequently, only a limited inventory is needed to fill orders for a complete range of sizes, lengths, and coupling styles. Moreover, the separate threaded shroud ends, bell ends and flanges are lighter, take up less room, and are easier to handle than a comparable inventory of complete wall castings.

As mentioned previously, an important feature of the present invention is a free-standing support structure for a wall casting. Referring to FIG. 3, this support structure includes a pair of angle columns 39 and 40 that are attached at their upper ends to the mounting lugs or equivalent mounting means of a shrouded wall casting 10 by means of bolts 41. The lower ends of support columns 39 and 40 are attached by bolts 42 to the upright legs of pedestal brackets 43.

Brackets 43 have split or bifurcated feet 44 which permit the bracket to straddle a plastic water stop barrier 45 that is set into a poured concrete foundation slab 46 of a water or sewage treatment tank, for example. Such water stop barriers are conventionally employed at the joints between separately poured foundation slab and walls of a concrete tank and are normally placed near the centerline of the wall.

The bracket feet of the support structure are secured to the foundation by preplaced studs 47 and nuts 48 on either side of the water stop barrier to give a stable footing to the support structure without breaching the barrier.

The advantages of the support structure shown in FIG. 3 are apparent from the drawing. All wall castings for an entire wall section can be properly located by these free-standing supports merely by cutting the angle columns to proper length and by preinstalling the foundation studs in forms before the slab is poured. Since the mounting means of the wall casting are located intermediate the ends, they are close to the center of gravity of the sleeve assembly. This minimizes the moment forces acting on the upper ends of the angle columns, thereby reducing their tendency to buckle.

At the same time, locating the mounting means on the shroud as far as possible from the bolting flange keeps the support structure out of the way of the formwork that is subsequently erected. Once the wall castings for a tank have all been set in place on individual free-standing support structures, reinforcing steel can be installed without concern that there will be interference problems later on.

Although the above description is directed to preferred embodiments of the invention, other variations and modifications will be apparent to those skilled in the art and may be made wihout departing from the spirit and scope of the invention.

I claim:

1. A pipe fitting adapted for use as a wall casting in a poured concrete wall having a predetermined thickness, the pipe fitting comprising:

a cylindrical pipe barrel having a first end and a second end, the first end being adapted to be connected to another pipe end by a split clamp type of coupling, and the length of the pipe barrel between the first and second ends being equal to the predetermined thickness of a poured concrete wall in which the fitting is intended to be installed, an annular shroud surrounding the first end in radially spaced relation to the outer surface of the pipe barrel, a circumferential continuous blank flange extending radially from the periphery of the shroud at a location spaced axially inward from said first end to serve as a water stop when the fitting is installed in a concrete wall;

a circumferential wall connecting the shroud to the pipe barrel at a location spaced from the first and second ends, the shroud terminating at the circumferential wall so that at least a portion of the pipe barrel between the circumferential wall and the second end is unshrouded, and the shroud extending axially from the circumferential wall toward the first end to terminate in the plane of said first end to form with said circumferential wall an open well having sufficient space to provide access for mounting a split clamp coupling on said first end after the fitting has been installed on such a poured concrete wall with the shroud and the first end terminating flush with one side of the wall.

2. A pipe fitting according to claim 1 further comprising said second end being adapted to be connected to an additional pipe end by a split clamp type of coupling, another annular shroud surrounding the second end in radially spaced relation to the outer surface of the pipe barrel, and another circumferential wall connecting the other shroud to the pipe barrel at a location spaced both from the second end and from the first circumferential wall, the other shroud extending axially outward from the other circumferential wall to terminate at the plane of said second end to form with said other circumferential wall an open well around said second end having sufficient space to provide access for mounting a split clamp coupling on said second end after the fitting has been installed in such a poured concrete wall with the other shroud and the second end terminating flush with the other side of the wall.

3. A pipe fitting according to claim 2 wherein the respective shrouds and circumferential walls surrounding the first and second ends are formed integrally with said pipe barrel.

4. A pipe fitting according to claim 1 wherein the blank water stop flange is located in the plane of the circumferential wall.

5. A pipe fitting according to claim 1 further comprising at least one mounting lug formed as an integral outward extension of said blank flange to permit independent support of said fitting at said mounting lug intermediate said first and second ends in position between wall forms placed flush with each end of the fitting prior to pouring concrete for a wall between the forms.

6. A pipe fitting according to claim 1 comprising mounting means attached to the fitting intermediate the first and second ends for attachment to a supporting structure for the fitting.

7. A pipe fitting and support structure assembly adapted for use as a wall casting in a poured concrete wall having a predetermined thickness, the fitting and support structure assembly comprising:
- a cylindrical pipe barrel having a first end and a second end, the first end being adapted to be connected to another pipe end by a split clamp type of coupling, and the length of the pipe barrel between the first and second ends being equal to the predetermined thickness of a poured concrete wall in which the fitting is intended to be installed;
- an annular shroud surrounding the first end in radially spaced relation to the outer surface of the pipe barrel, the shroud being attached to the pipe barrel at a location spaced from the first and second ends and extending axially therefrom to terminate at the plane of said first end to form an open well adapted to provide access for mounting a split clamp coupling on said first end after the fitting has been installed in such a poured concrete wall with the shroud and the first end terminating flush with one side of the wall;
- mounting means attached to the fitting intermediate the first and second ends;
- an elongated angle column having one end fastened to the mounting means; and
- a right-angle pedestal bracket having an upright leg portion fastened to the outer end of the angle column and a bifurcated foot portion extending substantially normal to the leg portion, the foot portion being adapted to be bolted to a foundation, the bifurcation of the foot portion forming a slot extending upward into the leg portion a predetermined distance to adapt the bracket to straddle an upright water stop barrier strip partially embedded in said foundation.

8. A pipe fitting and support structure assembly adapted for use as a wall casting in a poured concrete wall having a predetermined thickness, the fitting and support structure assembly comprising:
- a cylindrical pipe barrel having a first end and a second end, the first end being adapted to be connected to another pipe end by a split clamp type of coupling, and the length of the pipe barrel between the first and second ends being equal to the predetermined thickness of a poured concrete wall in which the fitting is intended to be installed;
- an annular shroud surrounding the first end in radially spaced relation to the outer surface of the pipe barrel, the shroud being attached to the pipe barrel at a location spaced from the first and second ends and extending axially therefrom to terminate at the plane of said first end to form an open well adapted to provide access for mounting a split clamp coupling on said first end after the fitting has been installed in such a poured concrete wall with the shroud and the first end terminating flush with one side of the wall;
- a pair of mounting lugs attached to opposite sides of the pipe barrel intermediate the first and second ends;
- a pair of support columns, each column being attached at one end to one of the pair of mounting lugs; and
- a pair of pedestal brackets, each bracket having an upright leg portion attached to the other end of each support column and a bifurcated foot portion extending substantially normal to the leg portion, the foot parts of the pair of pedestal brackets being adapted to be attached to a foundation, the bifurcation of the foot portion forming a slot extending upward into the leg portion a predetermined distance to adapt the bracket to straddle an upright water stop barrier strip partially embedded in said foundation.

* * * * *